July 31, 1934.  H. L. ZABRISKIE  1,968,238
HANDLE RELEASE MECHANISM FOR VACUUM CLEANERS
Filed June 13, 1931  2 Sheets-Sheet 1
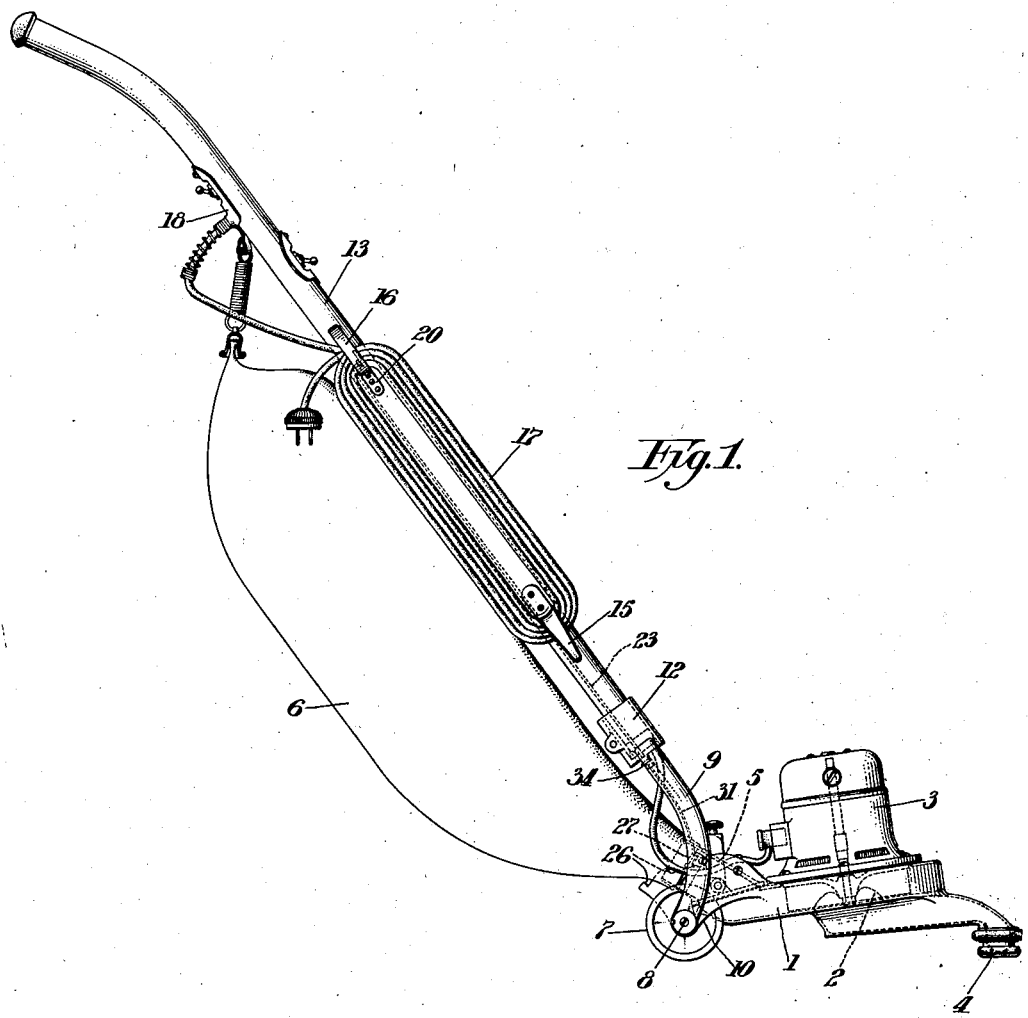
Inventor
Henry L. Zabriskie

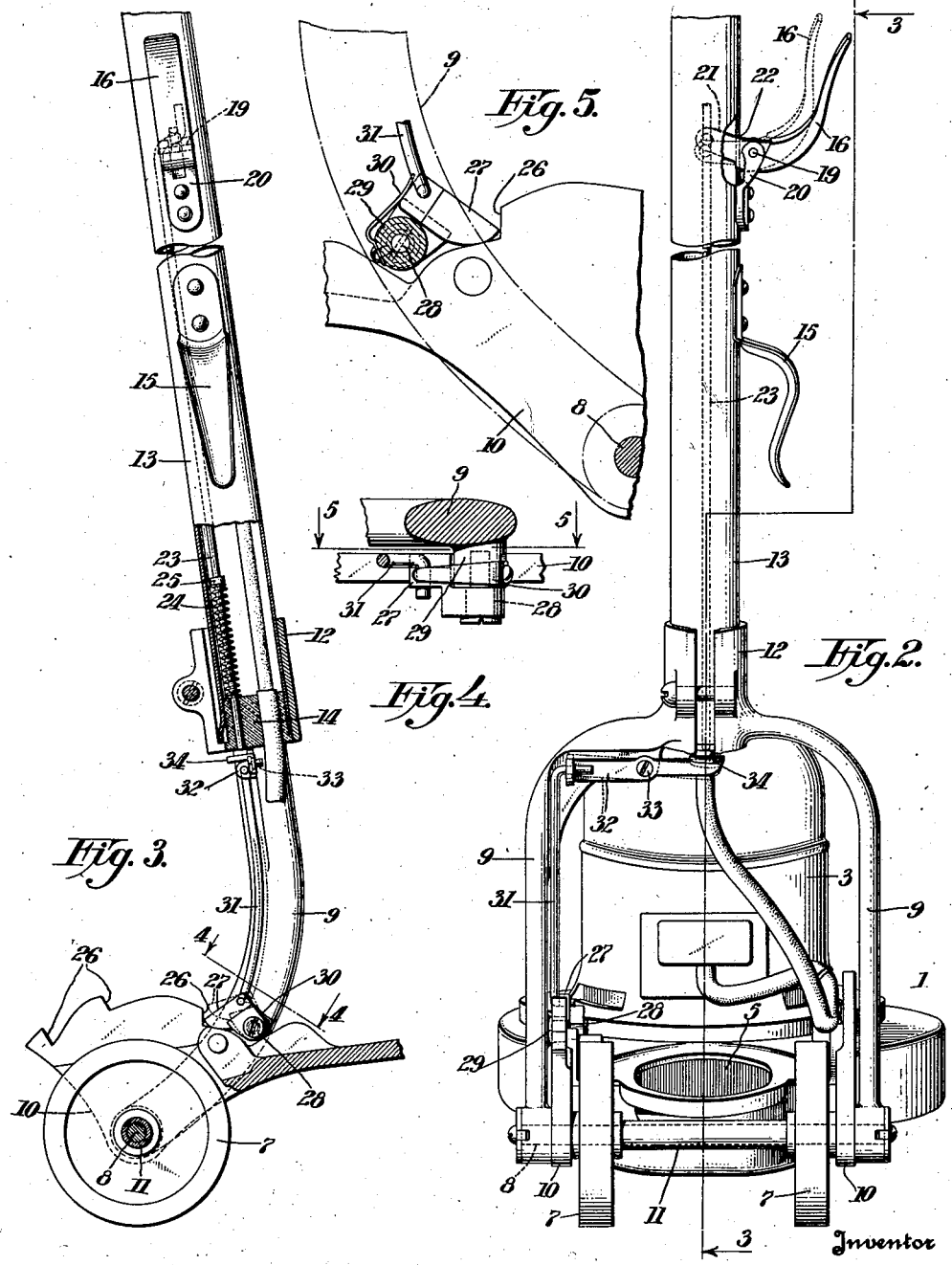

Patented July 31, 1934

1,968,238

UNITED STATES PATENT OFFICE 1,968,238

HANDLE-RELEASE MECHANISM FOR VACUUM CLEANERS

Henry L. Zabriskie, Westfield, N. J., assignor to The Singer Manufacturing Company, Elizabeth, N. J., a corporation of New Jersey Application June 13, 1931, Serial No. 544,093

1 Claim. (Cl. 306—13)

This invention relates to vacuum cleaners of the domestic type having an electric suction-fan including a casing formed with an air-inlet nozzle and to which is pivotally connected a handle by which the device is propelled over the floor.

The invention has for an object to provide a handle-supporting latch which may be conveniently manipulated by the operator and which is simple in construction and easy to assemble.

A further object of the invention is to provide a vacuum cleaner handle-supporting latch-mechanism of such a nature that it does not in any way interfere with or impede the assembly or disassembly of the upper tubular portion of the handle with or from the lower forked portion of the handle.

Still further, the invention has for an object to provide for the convenient manipulation of the latch without externally encumbering the handle with devices additional to the customary equipment.

With the above and other objects in view, as will hereinafter appear, the invention comprises the devices, combinations and arrangements of parts hereinafter described and claimed.

The features of the invention and the advantages attained thereby will be readily understood by those skilled in the art from the following detailed description of a preferred embodiment of the invention illustrated in the accompanying drawings in which Fig. 1 is a side elevation of a vacuum cleaner embodying the invention. Fig. 2 is a rear elevation of the vacuum cleaner with the dust-bag removed. Fig. 3 is a vertical section through the handle of the vacuum cleaner on the line 3—3, Fig. 2. Fig. 4 is a section on the line 4—4, Fig. 3, and Fig. 5 is a section on the line 5—5, Fig. 4, showing the handle latch from the side opposite to that shown in Fig. 3.

1 represents the usual casing for the suction-fan 2 driven by the electric motor 3. The casing 1 is formed with the air-inlet opening or nozzle 4 and outlet opening 5 to which is connected the dust-bag 6. The casing is supported at its rearward end by the wheels 7 which are journaled on the shaft 8 connecting the tines 9, 9 of the forked lower end-portion of the handle by which the vacuum cleaner is propelled over the floor. The shaft 8 passes freely through alined apertures in the ears 10 which extend rearwardly from the casing 1 and constitutes a pivotal connection between the handle and the fan-casing. The sleeve 11 on the shaft 8 between the wheels 7, holds such wheels properly spaced apart.

The forked lower end of the handle is formed with a split socket 12 in which is removably clamped the lower end of the tubular upper portion 13 of the handle. The lower end of the tubular handle member 13 is closed by a cylindrical plug 14. Mounted on the handle 13 are the oppositely extended supporting hooks 15 and 16 for the electric conductor cord 17 which enters the hollow handle 13 through the cord inlet fitting 18. The lower hook 15 is rigidly mounted on the handle member 13. The upper hook 16 is pivoted at 19 to the bracket piece 20 fixed to the handle member 13. The hook 16 is in the form of a lever and includes an arm 21 which extends into the tubular handle member 13 through a slot 22 in the side wall thereof. The upper end of the slot 22 limits the outward motion of the hook 16 to the full line position shown in Fig. 2.

Connected to the arm 21 of the upper cord-supporting hook 16 is the upper end of the push-rod 23 which extends downwardly within the hollow handle member 13 and through an aperture in the plug 14. A coil-spring 24, surrounding the push-rod 23 and interposed between the plug 14 and a collar 25 fixed to the push-rod 23, acts as a recovery spring to restore the push-rod to its uppermost position when the operator releases the hook-member 16 after having pressed the latter inwardly to dotted line position shown in Fig. 2.

One of the ears 10 of the casing 1 is formed with a series of handle-supporting shoulders 26 with which cooperate a latch 27 pivoted on the screw-pin 28 fixed in the lug 29 integral with one of the tines 9 of the forked lower end of the handle A leaf-spring 30 fixed at one end to the lug 29 bears upon the latch 27 and tends to press the latter into engagement with the shouldered portion of the adjacent ear 10 of the casing 1. The latch 27 is connected by the bent wire link 31 to one end of the lever 32 which is fulcrumed at 33 to the forked portion of the handle. The lever 32 is formed at its opposite end with an ear 34 the upper flat face of which is adapted to be engaged and depressed by the lower end of the push-rod 23.

It is evident that the latch 27, in cooperation with the shoulders 26 will support the handle at a selected one of three different elevations. When it is desired to shift the handle from a higher to a lower elevation, the operator merely presses inwardly upon the upper cord-hook 16 which is conveniently within reach of the operator's hand. The inward motion of the cord-hook 16 acts, through the interconnecting mechanism, to raise the latch 27 out of engagement with the adjacent shoulder 26 and permits the handle to be lowered to the desired elevation.

As the connection between the lever 32 and the rod 23 is a push-contact connection, it is unnecessary to pay especial attention to the latch-operating mechanism in the act of assembling the upper portion 13 of the handle in the socket 12 of the lower portion 9.

While I have described in specific terms one illustrated embodiment of the invention, it will be obvious that the invention is not limited to the details of construction and relative arrangement of parts shown and described but is susceptible of embodiment in various specific forms.

Having thus set forth the nature of the invention, what I claim herein is:—

In a motor-driven device, an ambulant frame, a handle including a lower forked portion pivotally connected to said frame and an upper tubular portion detachably connected to said forked portion, a latch for supporting said handle when the latter is released by the operator, a lever fulcrumed on said forked portion and connected at one end to said latch, a manually operated push-rod extending within the upper tubular portion of said handle and adapted to press downwardly upon the other end of said lever to release said latch.

HENRY L. ZABRISKIE.